United States Patent

Brun, Jr. et al.

Patent Number: 5,531,588
Date of Patent: Jul. 2, 1996

[54] ADJUSTABLE CAM TRACK FOR AN INJECTION MOLDING MACHINE

[75] Inventors: Charles J. Brun, Jr., Xenia; Dwayne Bercot, Fletcher; Anthony Newport, New Carlisle, all of Ohio

[73] Assignee: Electra Form, Inc., Vandalia, Ohio

[21] Appl. No.: 435,702

[22] Filed: May 5, 1995

[51] Int. Cl.$^6$ .................................................. B29C 45/40
[52] U.S. Cl. .................... 425/556; 264/334; 425/572; 425/DIG. 5
[58] Field of Search ................................. 425/556, 572, 425/DIG. 5; 264/334

[56] References Cited

U.S. PATENT DOCUMENTS 4,497,624 2/1985 Brun et al. ............................. 425/556

Primary Examiner—Tim Heitbrink
Attorney, Agent, or Firm—Locke Reynolds

[57] ABSTRACT

An adjustable cam track for an injection molding machine includes a set of guides coupled to a moveable platen for guiding the movement of space defining surfaces which are movably mounted to a stripper platen as it moves with respect to the movable platen. A set of cam followers coupled to the space defining surfaces cause relative movement of each pair of surfaces to release molded articles previously striped from the molds of the molding machine. A set of cam inserts engage the cam followers and are adjustably positionable with respect to the guides to adjust the point of release of the molded articles. Each guide includes a pair of guide walls forming a channel defining two limits of position of the cam follower engaged therein. Each cam insert is received between the guide walls and includes a pair of cam insert walls spaced apart by a distance about equal to the size of the cam follower engaged therein to define a path of movement for the cam follower between the two limits of position. Each cam insert includes a first toothed rack, while a second toothed rack is removably fixed to each guide and engages the first toothed rack to fix the position of each cam insert relative to each guide only at certain preselected locations to coordinate the operation of all the cam followers thereby avoiding any wear imbalance.

20 Claims, 4 Drawing Sheets

ADJUSTABLE CAM TRACK FOR AN INJECTION MOLDING MACHINE

BACKGROUND OF THE INVENTION

The present invention is directed generally to injection molding machines having a stripper for stripping molded articles from the mold core subsequent to removal of the article from the mold cavity, and particularly to means for adjusting the position and/or timing of release of the molded article from the stripper.

Injection molding machines commonly include a fixed platen which is generally fixed at a specific location with respect to the base of the injection molding machine. This fixed platen can take the form of a mold base and can include the runner or manifold system coupled between the mold base and a plasticizing injector unit. The mold base and/or fixed platen generally includes one or more mold cavity units which, together with a core unit, defines a space into which molten plastic is injected to form one or more articles. The core units are movable with respect to the base and are generally mounted on a movable platen which reciprocates with respect to the fixed platen between a closed position where the core unit and cavity unit are engaged with each other to define the molding space and an open position where the plastic article can be removed from the molding machine.

Molding machines also often include a stripper for stripping the molded articles from the core or cavity unit. In some instances, the stripper takes the form of some additional space defining surfaces which act together with the mold cavity and mold core to define the space receiving plastic material from the injection unit. The space defining surfaces on the stripper are generally designed to intimately engage the molded article so the article can be successfully removed from the core and cavity assemblies and additionally require some action to affirmatively cause release of the molded article from the space defining surfaces. The successful operation of this stripping and plastic part release has been the subject of some prior development.

In order to have the space forming surfaces release the molded article once it has been successfully stripped from the core and cavity unit, the space defining surfaces have been coupled to an actuating means as shown in U.S. Pat. No. 4,497,624. The space defining surfaces are there disclosed to constitute thread splits for forming threads on a portion of each molded article with each of the thread splits being coupled to an actuator for causing relative movement of the thread splits. The actuator is in turn coupled to cam followers which ride within a track. The track includes an insert which defines a ramp or incline which, interacting with the cam followers, causes the actuator to move the thread splits engaging the molded article in such a way to release the article. In use, at least two, and typically four, such track inserts are employed and are adjustable in position with respect to the track to permit adjustment of the timing and/or point of release of the molded article. The adjustability of the position of the track inserts itself caused some difficulty in that it is difficult to position all four track inserts at the same relative position in the respective tracks to cause a balanced application of force to move the thread splits apart, the imbalance of force results in an unintended strain and wear on the equipment and led to unreliable part separation.

The use of a single fixed position ramp or incline fails to permit the variability in operation of the mold unit thought to be desirable in that changes in the confirmation of the core and cavity unit can also require changes in the part release point. Thus, the use of single position ramps or inclines to activate the actuators by means of the cam followers is not a viable alternative. It was therefore desirable to develop apparatus interactive with a cam coupled to an actuator for causing release of parts from a molding machine which cam would be adjustable in position yet easily coordinated with other like cams on the same machine to avoid any unbalanced application of force and would improve part drop performance.

SUMMARY OF THE INVENTION

In accordance with the present invention, an adjustable cam track for an injection molding machine includes a set of guides which are coupled to the movable platen or core base of an injection molding machine. The guides act to guide the movement of space defining surfaces such as thread splits which are movably mounted on the stripper platen. A set of cam followers are coupled to the space defining surfaces by actuators to cause relative movement of the pair of surfaces to release molded articles previously stripped from the molds of the molding machine. A set of cam inserts engage the cam followers and are adjustably positioned with respect to the guides to adjust the point of release of the molded articles. Each guide includes a pair of guide walls forming a channel defining two limits of position of the cam follower engaged in the channel. Each cam insert is received within the guide walls and defines the path of movement for the cam follower between the two limits of position. The path of movement defined by the cam insert is a matter of choice of design and includes one or more inclined areas for guiding the cam follower from one position to another within the two limits of position defined by the guide walls. Each cam insert includes a first tooth rack while a second tooth rack is removably fixed to each guide. The two toothed racks interengage to fix the position of each cam insert relative to each guide only at certain pre-selected locations so that coordination of the position and therefore operation of all of the cam followers can occur, thereby avoiding any stress or wear in balance.

One feature of the present invention is the presence of at least one index mark on one of the walls of the guide means and a plurality of graduation marks on one of the walls of the cam insert. This feature provides for an easy indication of the selected position of the cam insert with respect to the guide thereby enabling a simple coordination of the position of all of the cam inserts.

Another feature of the invention is the inclusion of a cam insert extension secured to the cam insert to have one wall aligned with the surface defining the path of the cam follower. Such a cam insert extension has the advantage of lengthening the adjustability of the release point.

Other features and advantages of the present invention will become apparent to those Skilled in the art upon consideration of the following description of the preferred embodiment. The description refers to the accompanying drawings which, together with the description, disclose the best mode of carrying out the invention as presently perceived.

DESCRIPTION OF THE PREFERRED EMBODIMENT

Figure 1:
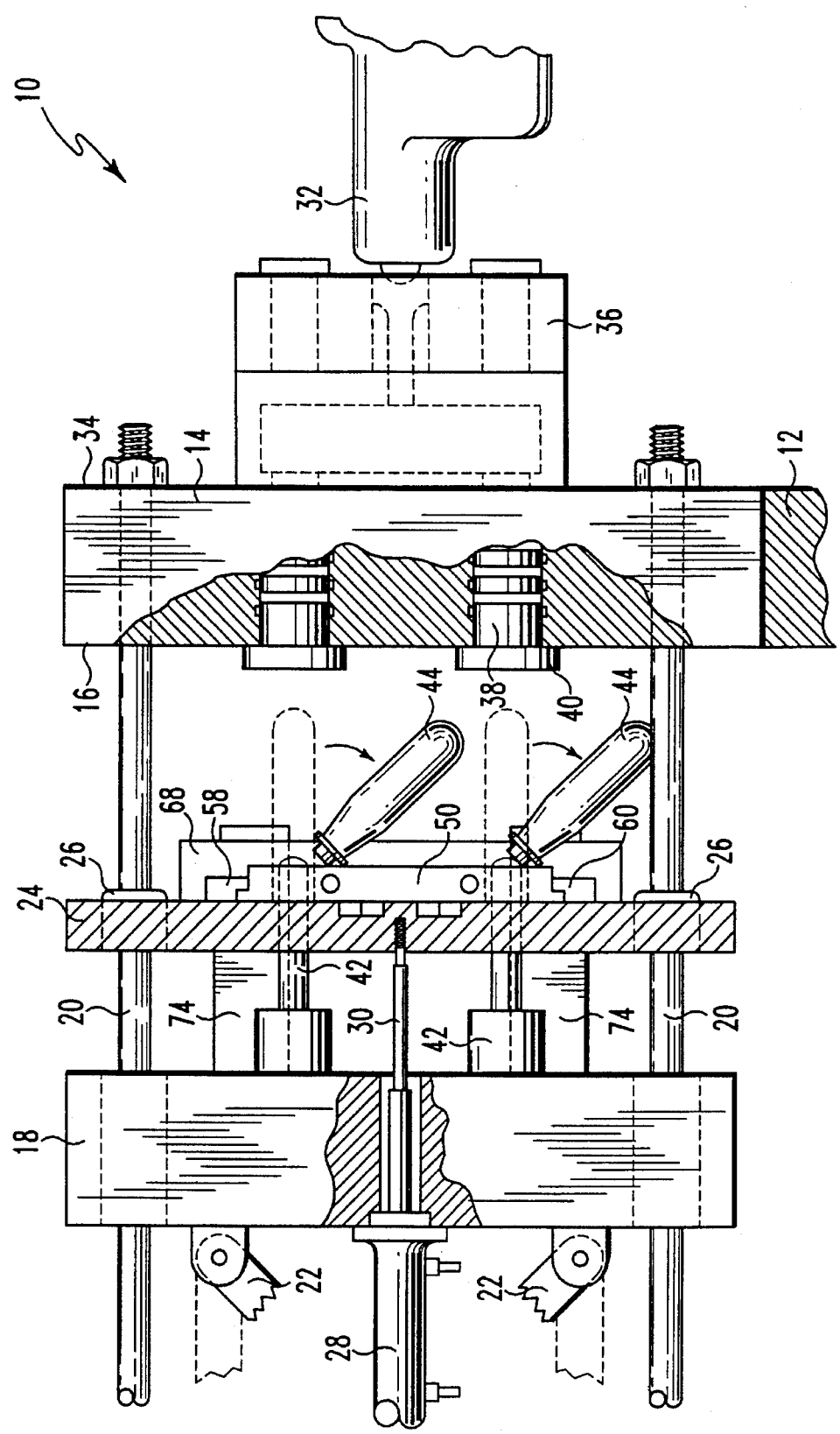
FIG. 1 is a side elevation view of an injection molding apparatus partially broken away to show selected features of the apparatus.

An injection molding machine 10 according to the present invention is shown generally in FIG. 1 to include a base 12 and a stationary platen 14 which is fixed with respect to base 12. The stationary platen 14 has a front face 16 facing a movable platen 18 which moves on guide means 20. The movement of the movable platen 18 is achieved by a first motive means 22 which is illustrated in the form of a clamp toggle, but which could be any conventional mechanical, hydromechanical, or hydraulic clamping mechanism.

Situated between the stationary platen 14 and the movable platen 18 is a stripper platen 24 which is also guided for movement on the guide means 20 by means of bushings 26. The stripper platen 24 is moved with respect to the movable platen 18 by a second motive means 28 which is shown to be a hydraulic cylinder having a piston rod 30 extending through the movable platen 18 and secured to the stripper platen 24. Other motive means such as an air cylinder, rack and pinion gear, etc., could be employed for this same purpose.

The plasticizing-injector unit 32 is coupled to the back face 34 of the fixed platen 14 by means of a manifold assembly 36. The manifold assembly 36 directs the plastic material from the plasticating injector unit 32 to a mold cavity assembly 38 which includes a plurality of mold cavity units 40. A mold core assembly including mold cores 42 are connected to the movable platen 18 such that the cavities 40 and cores 42 can be cooperatively engaged to one another to form a space for receiving plastic material from the plasticator unit 32 to form molded articles 44.

The molded articles are shown in FIG. 1 as they are being ejected from the molding machine after being stripped from the cores 42. While the specific examples illustrated in the figures of injection molded parisons or preforms for the manufacture of blow molded plastic bottles and containers, this use is merely illustrative and is not intended to restrict the scope of utility of the invention described and claimed.

The injection molding machine 10 is shown in FIG. 1 with the movable platen 18 separated from the fixed platen 14 by a distance necessary to eject the molded articles 44. This ejection is achieved through the use of apparatus shown more fully in FIG. 2 which shows the face of the stripper platen 24 confronting face 16 of the fixed platen 14. Mounted to the stripper platen 24 are a plurality of pairs of space defining surfaces 46, commonly known in the trade as "thread splits". The thread splits cooperate with the core 42 and cavity 40 to complete the definition of the space which receives the plastic forming article 44. The space defining surfaces hold the articles 44 as it is stripped from the core 42. Each half 46a and 46b of the thread split is mounted to a separate slide 50 or 52 by screws 54 which secure the thread splits against seat 56. The slides 50 and 52 reciprocate laterally within a channel defined by brackets 58 and 60.

The slides 50 are secured together by tie members 62 while slides 52 are tied together by tie members 64 such that the lateral movement of all slides 50 or 52 is uniform and coordinated. The movement is caused by actuating rods 66 which extend through block 68 secured to the face of stripper platen 24. The actuating rods 66 are coupled to beams 70 which have at each end a roller 72 which comprises a cam follower situated in a cam track 74 which is fixed to movable platen 18. As the stripper platen 24 is caused to move with respect to the movable platen 18 by means of motive means 28, the rollers 72 proceed along a channel defined by the cam track 74.

Figure 2:
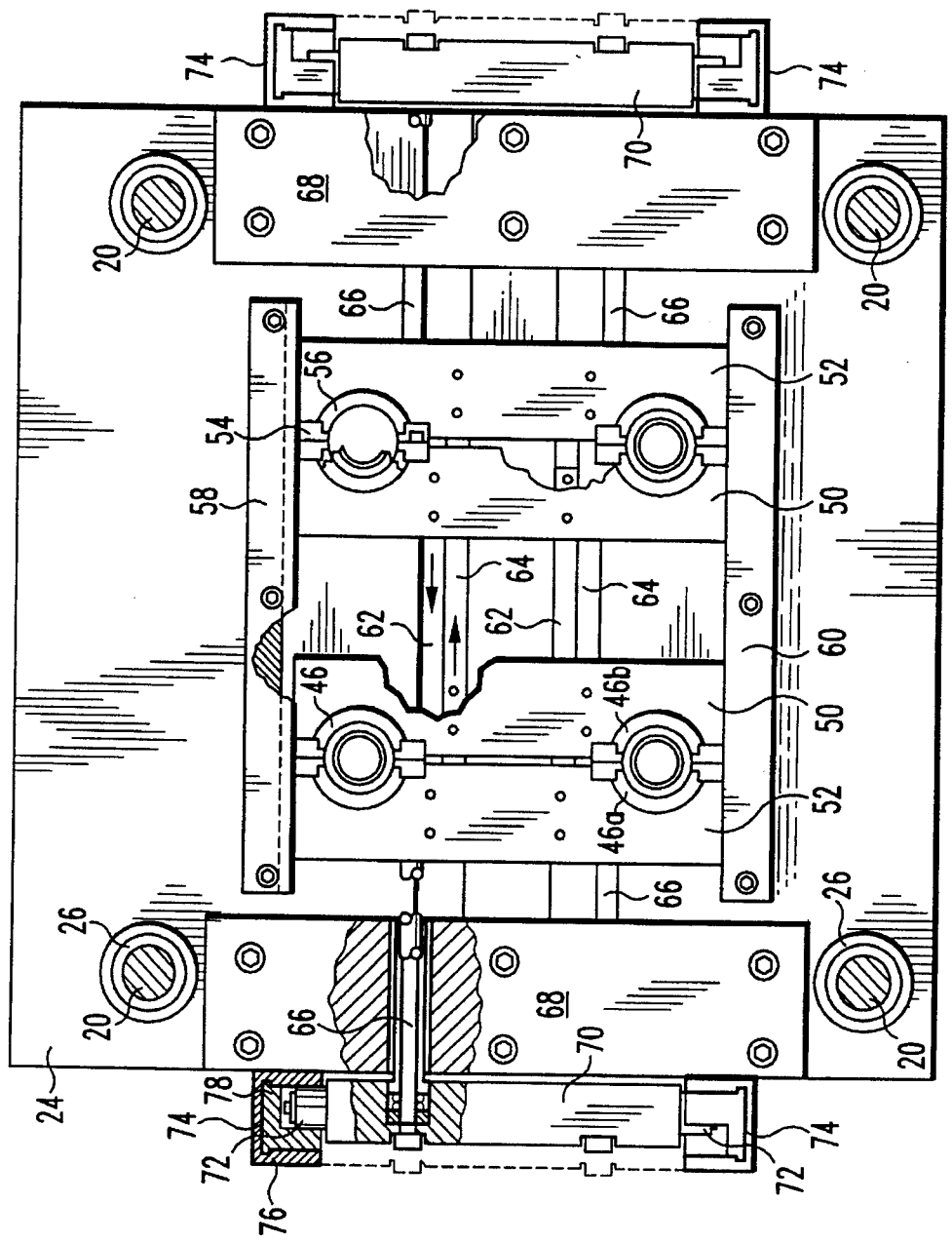
FIG. 2 is a front elevation view of a stripper platen having four pairs of space defining surfaces which are movable with respect to the stripper platen and the actuating mechanism for moving the same.

At a desired location, the cam track 74 is configured to cause the beams 70 to move from the position illustrated in FIG. 2 in solid lines outward to the position shown in phantom. This outward movement of beam 70 pulls the actuating rods 66 outward which in turn caused the slides 50 and 52 to move away from each other thereby separating the halves of the thread splits 46a and 46b from each other and releasing the part held by the thread split.

Figure 3:
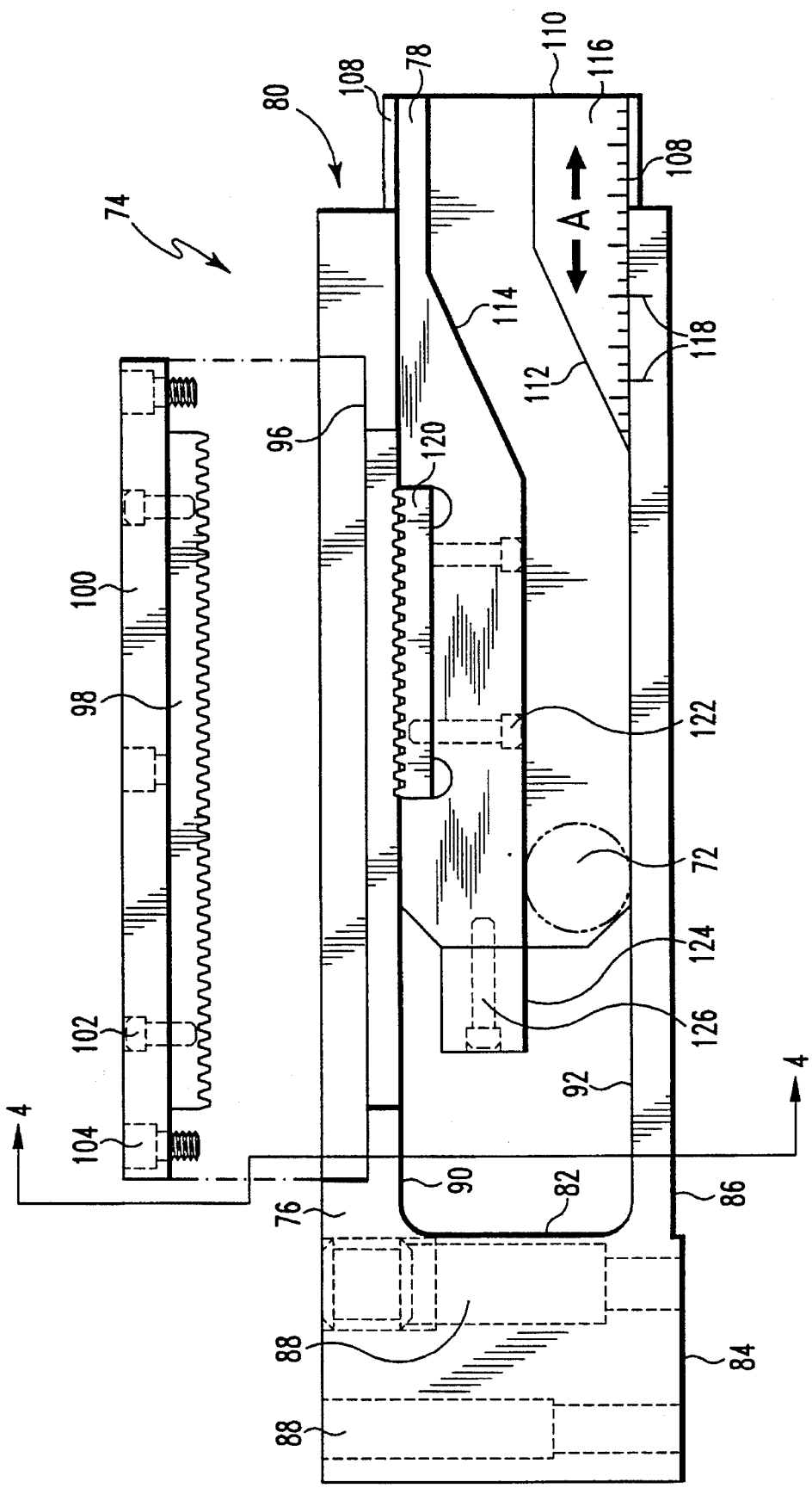
FIG. 3 is an exploded view of a guide and cam insert with the second tooth rack removed from the guide to permit linear adjustment of the cam insert with respect to the guide.
Figure 4:
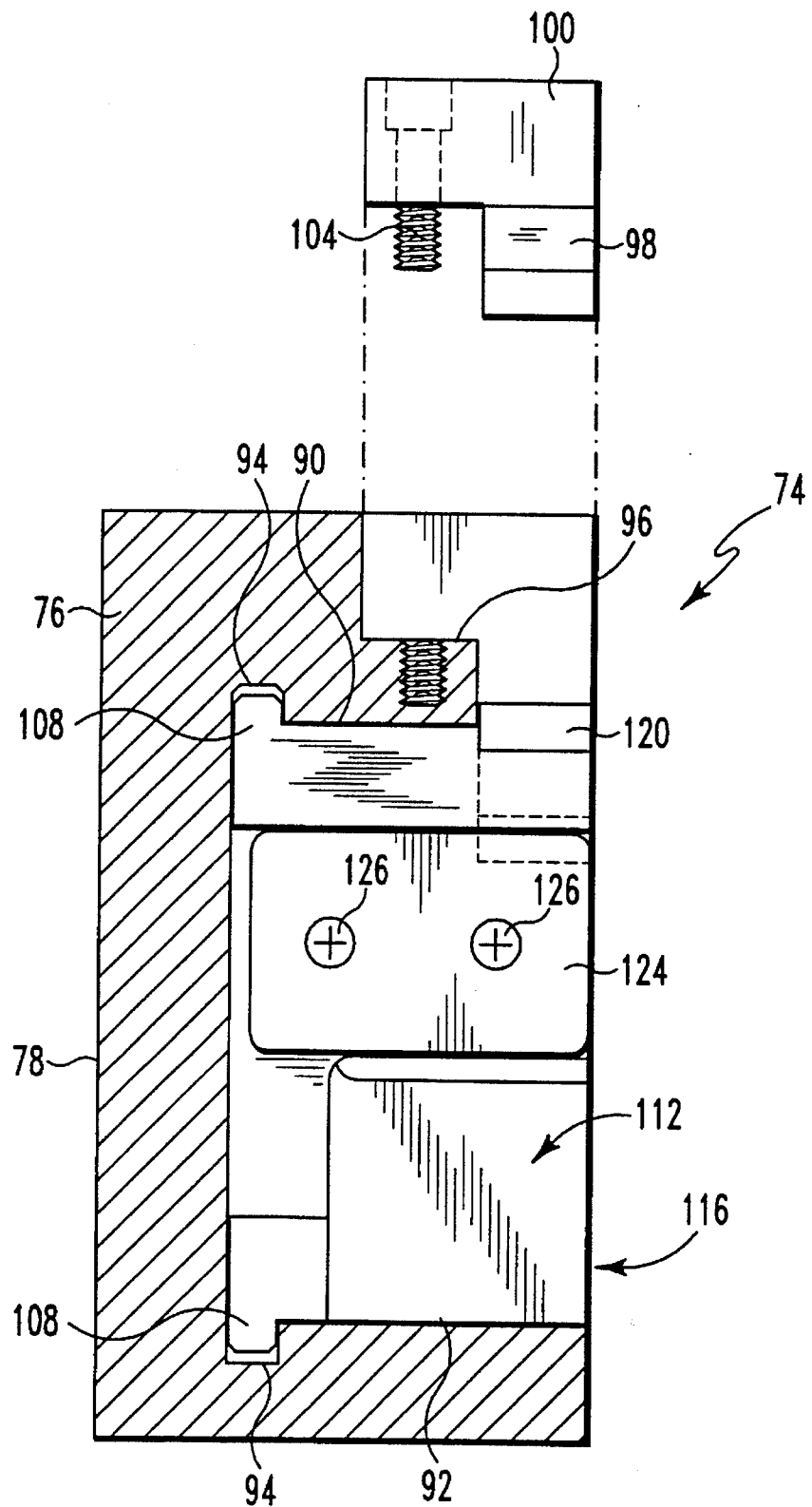
FIG. 4 is a sectional view of the guide and cam insert taken along line 4-4 of FIG. 3.

In the upper left of FIG. 2, the cam track is shown in section to comprise generally a channel shaped guide having within it a cam insert 78 which are shown in greater detail in FIGS. 3 and 4. The guide means 76 comprises in cross-section a generally U-shaped channel, the channel having an open end 80 and a closed end 82. The closed end 82 includes a land 84 which constitutes the surface of the guide 76 which is attached to the movable platen 18. The land 84 spaces the lower surface 86 away from the side of the stripper platen 24 by a clearance distance. Fastening elements (not shown) extend through openings 88 in closed end 82 to secure the guide 76 to the movable platen 18.

The U-shaped channel of guide 76 is defined by two walls 90 and 92 which define the limits of position of the cam follower 72 within the channel. Each of the walls 90 and 92 includes an undercut 94 shown in FIG. 4. Wall 90 also includes a stepped brake 96 for receiving a toothed rack 98 and retainer plate 100. The toothed rack 98 is secured to the retainer plate 100 by fasteners 102 shown in phantom in FIG. 3 while the retainer plate 100 is secured to wall 90 of the guide 76 by fasteners 104 which are received in openings 106 in wall 90.

The cam insert 78 is received between the pair of walls 90 and 92 and includes outwardly extending flanges 108 which engage the undercuts 94 at the base of walls 90 and 92 and allow slidable movement of the insert 78 with respect to the guide 76 in the direction A shown on FIG. 3. Depending on the position of the insert 78 in the guide 76, one end 110 of the insert 78 may project beyond the end 80 of guide 76 as shown in FIG. 3. The insert 78 includes a pair of walls 112 and 114 which define a path for the cam follower 72. It will be appreciated that the specific shape of the channel defined by walls 112 and 114 is a matter of choice of design and may be determined in part by the relative movement necessary to cause release of the molded article 44 from the thread splits 46a and 46b.

The path of movement defined by the cam insert 78 generally includes one or more inclined areas defined by walls 112 and 114 for guiding the cam follower 72 from one position to another within the two limits of position defined by the guide walls 90 and 92. To insure the cam follower 72 has a sufficiently long operational path, a cam insert extension 124 can be added to the end of cam insert 78 nearest closed end 82 of the channel and secured in place by fasteners 126 in alignment with the surface of wall 114 contacting cam follower 72.

The outside face 116 of wall 112 includes graduation markings which, in cooperation with reference marks 118 on wall 92 of guide 76, can be employed to accurately position the insert 78 with respect to the guide 76. Wall 114 also includes a tooth rack 120 secured in position by fasteners 122. The teeth of rack 120 and the teeth of rack 98 interengage when the retainer plate 100 is secured to wall 90. The interengagement of the teeth of the racks 98 and 120 fix the position of the insert 78 with respect to the guide 76 only at certain preselected locations defined by the pitch of the teeth on racks 98 and 120.

The point of release of the molded articles 44 is determined by the longitudinal position of the inclined portion of the walls 112 and 114, The stepwise adjustment of the position of the walls through the use of the interengaging racks 98 and 120 insures that all four cam tracks 74 will be similarly positioned at a selected location to coordinate the operation of all of the cam followers 72 causing simultaneous outward motion of beams 70 thereby avoiding undesired strains and wear in the molded part release mechanism.

Although the invention has been described in detail with reference to the illustrated preferred embodiment, variations and modifications exist within the scope and spirit of the invention as described and as defined in the following claims.

What is claimed is:

1. An adjustable cam track for an injection molding machine, said machine including a base, a first platen fixed to the base and having a mold cavity assembly, a second platen movable with respect to the base and said first platen and having a mold core assembly, a stripper platen movably interposed between the first and second platens and having at least one pair of space defining surfaces which together with the mold cavity and mold core assemblies defines at least one space for receiving plastic material injected therein to form at least one molded article, a first motive means for moving the second platen and the stripper platen away from the first platen to remove the at least one molded article from the mold cavity assembly, and a second motive means for separating the second platen and the stripper platen to remove the at least one molded article from the mold core assembly, the adjustable cam track comprising: a guide fixed to the second platen for guiding the movement of the stripper platen with respect to the second platen, a cam follower coupled to said at least one pair of space defining surfaces for causing relative movement of each pair of space defining surfaces to release the molded article from the molding machine, a cam insert engaging the cam follower, said cam insert being adjustably positionable with respect to the guide to adjust the point of release of the at least one molded article, the cam insert including a first toothed rack, and a second toothed rack removably fixed to the guide and engaging the first toothed rack to fix the position of the cam insert relative to the guide only at certain preselected locations.

2. The adjustable cam track of claim I wherein the guide comprises a pair of walls forming a channel defining two limits of position of the cam follower, the cam insert being received between the pair of walls to define a path of movement for the cam follower between the two limits of position.

3. The adjustable cam track of claim 2 wherein the guide includes an undercut at the base of each of the pair of walls and the cam insert includes outwardly extending flanges engaging the undercuts to allow slidable adjustment of relative position between the guide and the cam insert.

4. The adjustable cam track of claim 2 wherein one of said pair of walls includes a stepped break receiving said second toothed rack and fastening removably fastening the second toothed rack to the guide to engage the first toothed rack to fix the position of the cam insert relative to the guide only at certain preselected locations.

5. The adjustable cam track of claim 4 wherein the fastening comprises a retainer plate, a first set of fasteners securing the second toothed rack to the retainer plate and a second set of fasteners securing the retainer plate to a wall of the guide.

6. The adjustable cam track of claim 2 wherein one of the walls of the guide includes at least one index mark, and the cam insert includes a plurality of graduation marks alignable with the at least one index mark to indicate the selected position of said point of release.

7. The adjustable cam track of claim 1 wherein the cam insert includes a pair of walls spaced apart by a distance about equal to the size of the cam follower, a first of the cam insert walls including a recess confronting said second toothed rack, the recess receiving said first toothed rack, and fastening for securing the first tooth rack to the cam insert wall.

8. The adjustable cam track of claim 7 wherein the cam insert further includes a cam insert extension secured to the first of the pair of walls, the cam insert extension having a surface aligned with the surface of the first of the pair of walls facing the cam follower.

9. An adjustable cam track for an injection molding machine, said machine including a base, a first platen fixed to the base and having a mold cavity assembly defining a plurality of mold cavities, a second platen movable with respect to the base and said first platen and having a mold core assembly defining a plurality of mold cores, a stripper platen movably interposed between the first and second platens and having a plurality of pairs of space defining surfaces which together with the mold cavity and mold core assemblies define a plurality of spaces for receiving plastic material injected therein to form a plurality of molded articles, a first motive means for moving the second platen and the stripper platen away from the first platen to remove the molded articles from the mold cavity assembly, and a second motive means for separating the second platen and the stripper platen to remove the molded articles from the mold core assembly, the adjustable cam track comprising: a set of guides coupled to the second platen for guiding the movement of the stripper platen with respect to the second platen, a set of cam followers coupled to said pairs of space defining surfaces for causing relative movement of each pair of space defining surfaces to release the molded articles from the molding machine, a set of cam inserts engaging the cam followers, said cam inserts being adjustably positionable with respect to the guides to adjust the point of release of the molded articles, each cam insert including a first toothed rack, and a second toothed rack removably fixed to each guide and engaging the first toothed rack to fix the position of each cam insert relative to each guide only at certain preselected locations to coordinate the operation of all the cam followers thereby avoiding any wear imbalance.

10. The adjustable cam track of claim 9 wherein each guide comprises a pair of guide walls forming a channel defining two limits of position of the cam follower engaged therein, each cam insert being received between the pair of guide walls to define a path of movement for the cam follower between the two limits of position, and wherein one of said pair of guide walls includes a stepped break receiving said second toothed rack and fastening means removably fastening the second toothed rack to the guide to engage the first toothed rack to fix the position of the cam insert relative to the guide only at certain preselected locations.

11. The adjustable cam track of claim 10 wherein the fastening means comprises a retainer plate, a first set of fasteners securing the second toothed rack to the retainer plate and a second set of fasteners securing the retainer plate to a wall of the guide.

12. The adjustable cam track of claim 10 wherein each cam insert includes a pair of cam insert walls spaced apart by a distance about equal to the size of the cam follower engaged therein, a first of the cam insert walls including a recess confronting said second toothed rack, the recess receiving said first toothed rack, and fasteners for securing the first tooth rack to the cam insert wall.

13. The adjustable cam track of claim 12 wherein each cam insert further includes a cam insert extension secured to the first of the pair of cam insert walls, the cam insert extension having a surface aligned with the surface of the first of the cam insert walls facing the cam follower.

14. The adjustable cam track of claim 9 wherein each guide comprises a pair of guide walls forming a channel defining two limits of position of the cam follower engaged therein, each cam insert being received between the pair of guide walls to define a path of movement for the cam follower between the two limits of position, and wherein one of the walls of each guide includes at least one index mark, and each cam insert includes a plurality of graduation marks alignable with the at least one index mark to indicate the selected position of said point of release.

15. The adjustable cam track of claim 9 wherein each guide includes an undercut at the base of each of the pair of guide walls and each cam insert includes outwardly extending flanges engaging the undercuts to allow slidable adjustment of relative position between each guide and the cam insert engaged therein.

16. An adjustable cam track for an injection molding machine, said machine including a base, a first platen fixed to the base and having a mold cavity assembly defining a plurality of mold cavities, a second platen movable with respect to the base and said first platen and having a mold core assembly defining a plurality of mold cores, a stripper platen movably interposed between the first and second platens and having a plurality of pairs of space defining surfaces which together with the mold cavity and mold core assemblies define a plurality of spaces for receiving plastic material injected therein to form a plurality of molded articles, a first motive means for moving the second platen and the stripper platen away from the first platen to remove the molded articles from the mold cavity assembly, and a second motive means for separating the second platen and the stripper platen to remove the molded articles from the mold core assembly, the adjustable cam track comprising: a set of guides coupled to the second platen for guiding the movement of the stripper platen with respect to the second platen, a set of cam followers coupled to said pairs of space defining surfaces for causing relative movement of each pair of space defining surfaces to release the molded articles from the molding machine, a set of cam inserts engaging the cam followers, said cam inserts being adjustably positionable with respect to the guides to adjust the point of release of the molded articles, each guide including a pair of guide walls forming a channel defining two limits of position of the cam follower engaged therein, each cam insert being received between the pair of guide walls and including a pair of cam insert walls spaced apart by a distance about equal to the size of the cam follower engaged therein, the cam insert walls including at least one inclined portion to define a path of movement for the cam follower between the two limits of position, each cam insert including a first toothed rack, and a second toothed rack removably fixed to each guide and engaging the first toothed rack to fix the position of each cam insert relative to each guide only at certain preselected locations to coordinate the operation of all the cam followers thereby avoiding any wear imbalance.

17. The adjustable cam track of claim 16 wherein one of the walls of each guide includes at least one index mark, and each cam insert includes a plurality of graduation marks alignable with the at least one index mark to indicate the selected position of said point of release.

18. The adjustable cam track of claim 16 wherein one of said guide walls of each guide includes a stepped break for receiving said second toothed rack, and further comprises a retainer plate, a first set of fasteners securing the second toothed rack to the retainer plate and a second set of fasteners securing the retainer plate and second toothed rack in the stepped break to engage the first toothed rack to fix the position of the cam insert relative to the guide only at certain preselected locations.

19. The adjustable cam track of claim 18 wherein each guide includes an undercut at the base of each guide wall and each cam insert includes outwardly extending flanges engaging the undercuts to allow slidable adjustment of relative position between the guide and the cam insert when the toothed racks are not engaged.

20. The adjustable cam track of claim 16 wherein each cam insert further includes a cam insert extension secured to one of the cam insert walls, the cam insert extension having a surface aligned with the surface of the cam insert wall facing the cam follower.

\* \* \* \* \*